US00RE44166E

(19) United States
(12) Reissued Patent
Kim et al.

(10) Patent Number: US RE44,166 E
(45) Date of Reissued Patent: Apr. 23, 2013

(54) THIN FILM TRANSISTOR PANEL FOR LIQUID CRYSTAL DISPLAY

(75) Inventors: Hee-Seob Kim, Kyungki-do (KR); Kyong-Ju Shin, Kyungki-do (KR); Jong-Lae Kim, Seoul (KR); Young-Chol Yang, Kyungki-do (KR); Sung-Kyu Hong, Kyungki-do (KR)

(73) Assignee: Samsung Display Co., Ltd. (KR)

(21) Appl. No.: 12/889,001

(22) Filed: Sep. 23, 2010

Related U.S. Patent Documents

Reissue of:
(64) Patent No.: 7,427,972
Issued: Sep. 23, 2008
Appl. No.: 11/188,657
Filed: Jul. 26, 2005

U.S. Applications:
(63) Continuation of application No. 10/750,890, filed on Jan. 5, 2004, now Pat. No. 6,936,845.

(30) Foreign Application Priority Data

Jan. 3, 2003 (KR) ..... 10-2003-0000266

(51) Int. Cl.
*G09G 3/36* (2006.01)

(52) U.S. Cl.
USPC ..... 345/87; 345/92

(58) Field of Classification Search ..... 345/38, 345/50, 87–88, 92–96, 100, 214; 257/89; 349/43
See application file for complete search history.

(56) References Cited

U.S. PATENT DOCUMENTS

| | | | | |
|---|---|---|---|---|
| 4,840,460 | A | 6/1989 | Bernot et al. | |
| 5,777,700 | A | 7/1998 | Kaneko et al. | |
| 5,822,027 | A | 10/1998 | Shimada et al. | |
| 5,844,641 | A * | 12/1998 | Jun et al. | 349/38 |
| 5,847,781 | A | 12/1998 | Ono et al. | |
| 6,104,450 | A | 8/2000 | Hiraishi | |
| 6,380,011 | B1 | 4/2002 | Yamazaki et al. | |
| 6,525,788 | B1 | 2/2003 | Nakagawa et al. | |
| 6,650,379 | B2 | 11/2003 | Baek et al. | |
| 6,859,194 | B2 | 2/2005 | Aoyama et al. | |
| 6,936,845 | B2 | 8/2005 | Kim et al. | |
| 7,034,789 | B2 | 4/2006 | Takeuchi et al. | |

(Continued)

FOREIGN PATENT DOCUMENTS

| | | |
|---|---|---|
| JP | 05289108 | 11/1993 |
| JP | 06-102537 | 4/1994 |

(Continued)

*Primary Examiner* — William Boddie
*Assistant Examiner* — Mansour M Said
(74) *Attorney, Agent, or Firm* — Cantor Colburn LLP

(57) ABSTRACT

A thin film transistor array panel is provided, which includes: an insulating substrate; a first signal wire formed on the insulating substrate; a second signal wire formed on the insulating substrate and intersecting the first signal wire in an insulating manner; first and second pixel electrodes formed in a pixel area defined by the intersections of the first and the second signal wires and including a plurality of subareas partitioned by cutouts; a direction control electrode formed in the pixel area and including a portion overlapping at least one of the cutouts; and a first thin film transistor connected to the direction control electrode, the first signal wire, and the second signal wire.

32 Claims, 16 Drawing Sheets

U.S. PATENT DOCUMENTS

| | | | | |
|---|---|---|---|---|
| 7,113,159 | B2 | 9/2006 | Sawabe | |
| 7,180,490 | B2 | 2/2007 | Aoyama et al. | |
| 7,209,203 | B2 * | 4/2007 | Son | 349/139 |
| 2002/0039164 | A1 | 4/2002 | Song | |
| 2003/0053006 | A1 | 3/2003 | Baek et al. | |

FOREIGN PATENT DOCUMENTS

| | | | |
|---|---|---|---|
| JP | 07-013191 | A | 1/1995 |
| JP | 10-268349 | A | 10/1998 |
| JP | 2001-188242 | | 7/2001 |
| JP | 2001-235752 | A | 8/2001 |
| JP | 2001-290166 | A | 10/2001 |
| JP | 2002-258307 | A | 9/2002 |
| KR | 10-0271454 | B1 | 8/2000 |
| KR | 1020030030741 | A | 4/2003 |
| KR | 1020030072859 | A | 9/2003 |
| TW | 507094 | | 10/2002 |

* cited by examiner

THIN FILM TRANSISTOR PANEL FOR LIQUID CRYSTAL DISPLAY

Matter enclosed in heavy brackets [ ] appears in the original patent but forms no part of this reissue specification; matter printed in italics indicates the additions made by reissue.

CROSS REFERENCE TO PRIOR APPLICATIONS

This application is a continuation of application Ser. No. 10/750,890, filed Jan. 5, 2004, which claims priority to and the benefit of Korean Patent Application No. 10-2003-0000266 filed on Jan. 3, 2003 now U.S. Pat. No. 6,936,845, which are all hereby incorporated by reference for all purposes as if fully set forth herein.

BACKGROUND OF THE INVENTION (a) Field of the Invention

The present invention relates to a thin film transistor array panel, and in particular, to a thin film transistor array panel for a liquid crystal display.

(b) Description of the Related Art

A typical liquid crystal display ("LCD") includes an upper panel provided with a common electrode and an array of color filters, a lower panel provided with a plurality of thin film transistors ("TFTs) and a plurality of pixel electrodes, and a liquid crystal layer is interposed therebetween. The pixel electrodes and the common electrode are applied with electric voltages and the voltage difference therebetween causes electric field. The variation of the electric field changes the orientations of liquid crystal molecules in the liquid crystal layer and thus the transmittance of light passing through the liquid crystal layer. As a result, the LCD displays desired images by adjusting the voltage difference between the pixel electrodes and the common electrode.

The LCD has a major disadvantage of its narrow viewing angle, and several techniques for increasing the viewing angle have been developed. Among these techniques, the provision of a plurality of cutouts or a plurality of projections on the pixel electrodes and the common electrode opposite each other along with the vertical alignment of the liquid crystal molecules with respect to the upper and the lower panels is promising.

The cutouts provided both at the pixel electrodes and the common electrode give wide viewing angle by generating fringe field to adjust the tilt directions of the liquid crystal molecules.

The provision of the projections both on the pixel electrode and the common electrode distorts the electric field to adjust the tilt directions of the liquid crystal molecules.

The fringe field for adjusting the tilt directions of the liquid crystal molecules to form a plurality of domains is also obtained by providing the cutouts at the pixel electrodes on the lower panel and the projections on the common electrode on the upper panel.

Among these techniques for widening the viewing angle, the provision of the cutouts has problems that an additional mask for patterning the common electrode is required, an overcoat is required for preventing the effect of the pigments of the color filters on the liquid crystal material, and severe disclination is generated near the edges of the patterned electrode. The provision of the projections also has a problem that the manufacturing method is complicated since it is required an additional process step for forming the projections or a modification of a process step. Moreover, the aperture ratio is reduced due to the projections and the cutouts.

SUMMARY OF THE INVENTION

A thin film transistor array panel is provided, which includes: an insulating substrate; a first signal wire formed on the insulating substrate; a second signal wire formed on the insulating substrate and intersecting the first signal wire in an insulating manner; first and second pixel electrodes formed in a pixel area defined by the intersections of the first and the second signal wires and including a plurality of subareas partitioned by cutouts; a direction control electrode formed in the pixel area and including a portion overlapping at least one of the cutouts; and a first thin film transistor connected to the direction control electrode, the first signal wire, and the second signal wire.

The thin film transistor array panel may further include: a second thin film transistor connected to the first pixel electrode, the first signal wire, and the second signal wire.

The thin film transistor array panel may further include: a third thin film transistor connected to the first pixel electrode, the first signal wire, and the second signal wire.

Preferably, the first signal wire includes first and second signal lines, the second signal wire includes third and fourth signal lines, the second thin film transistor is connected to the first signal line, the third signal line, and the first pixel electrode, the third thin film transistor is connected to the second signal line, the third signal line, and the first pixel electrode, and the first thin film transistor is connected to the second signal line, the fourth signal line, and the direction control electrode.

The thin film transistor array panel may further include a third signal wire intersecting the second signal wire in an insulating manner.

Preferably, the first signal wire includes first and second signal lines, the second signal wire includes third and fourth signal lines, the second thin film transistor is connected to the first signal line, the third signal line, and the first pixel electrode, the third thin film transistor is connected to the second signal line, the third signal line, and the first pixel electrode, and the first thin film transistor is connected to the second signal line, the third signal wire, and the direction control electrode.

Preferably, the first signal wire includes first and second signal lines, the second signal wire includes third and fourth signal lines, the second thin film transistor is connected to the first signal line, the third signal line, and the first pixel electrode, the third thin film transistor is connected to the second signal line, the third signal wire, and the first pixel electrode, and the first thin film transistor is connected to the second signal line, the fourth signal line, and the direction control electrode.

The thin film transistor array panel may further include a coupling electrode connected to the first pixel electrode and overlapping at least one of the cutouts of the second pixel electrode, wherein the direction control electrode includes a portion overlapping one of the cutouts of the first pixel electrode and does not overlap the cutouts of the second pixel electrode.

The direction control electrode preferably overlaps the cutouts of the first and the second pixel electrodes.

The cutouts of the second pixel electrode may include a transverse cutout bisecting the second pixel electrode into upper and lower halves and a plurality of first oblique cutouts having inversion symmetry with respect to the transverse cutout, and the cutouts of the first pixel electrode may include a plurality of second oblique cutouts having inversion symmetry with respect to the transverse cutout.

The first and the second pixel electrodes preferably have inversion symmetry with respect to the transverse cutout.

The thin film transistor array panel may further include a third signal wire intersecting the second signal wire in an insulating manner and including an electrode disposed between the first pixel electrode and the second pixel electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
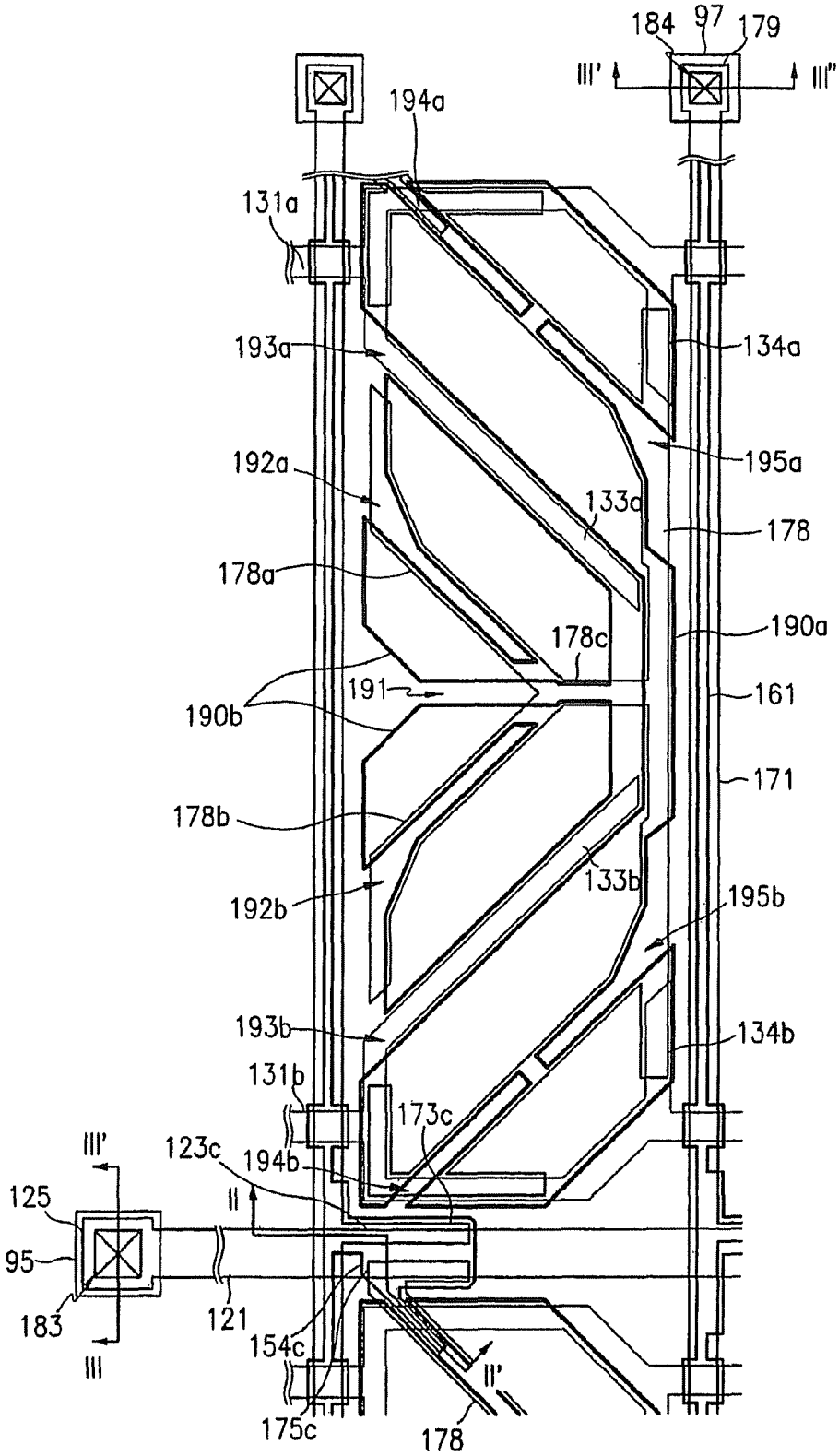
FIG. 1 is a layout view of an LCD an embodiment of the present invention.

The present invention now will be described more fully hereinafter with reference to the accompanying drawings, in which embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, liquid crystal displays according to embodiments of this invention will be described in detail with reference to the accompanying drawings.

Figure 2:
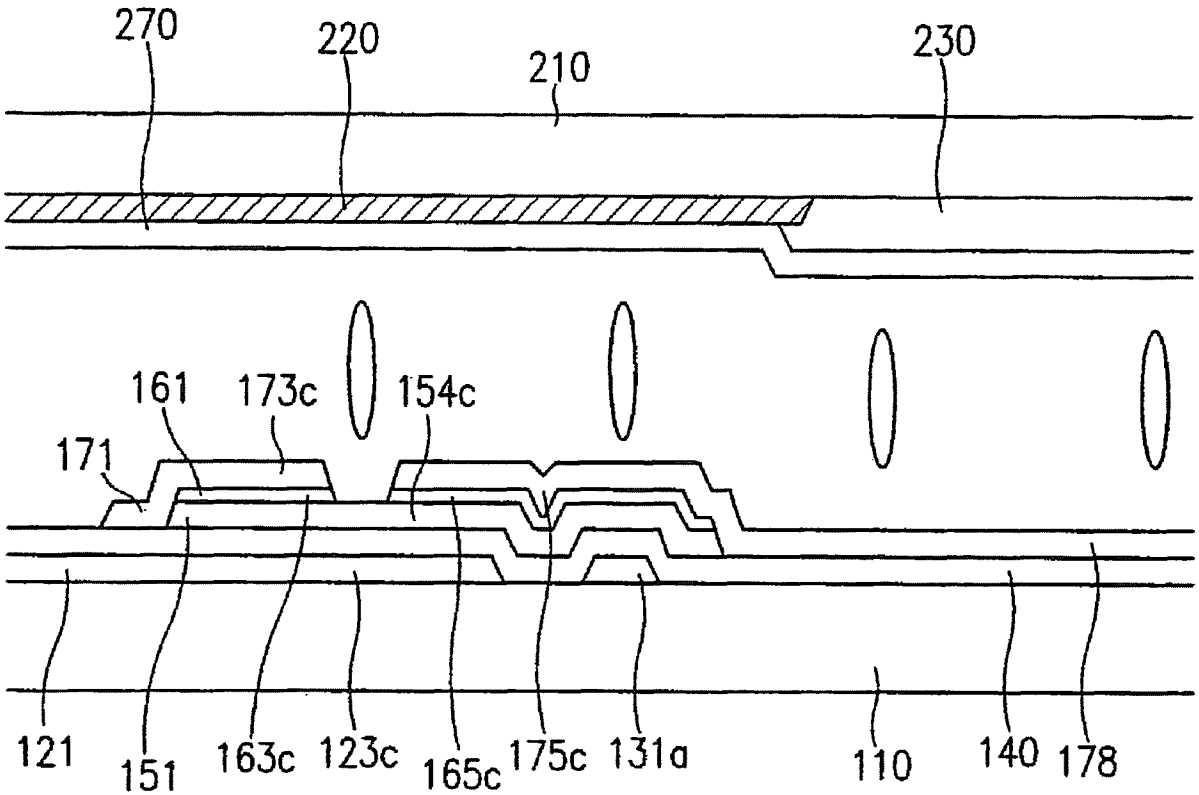
FIG. 2 is a sectional view of the LCD shown in FIG. 1 taken along the line II-II'.
Figure 3:
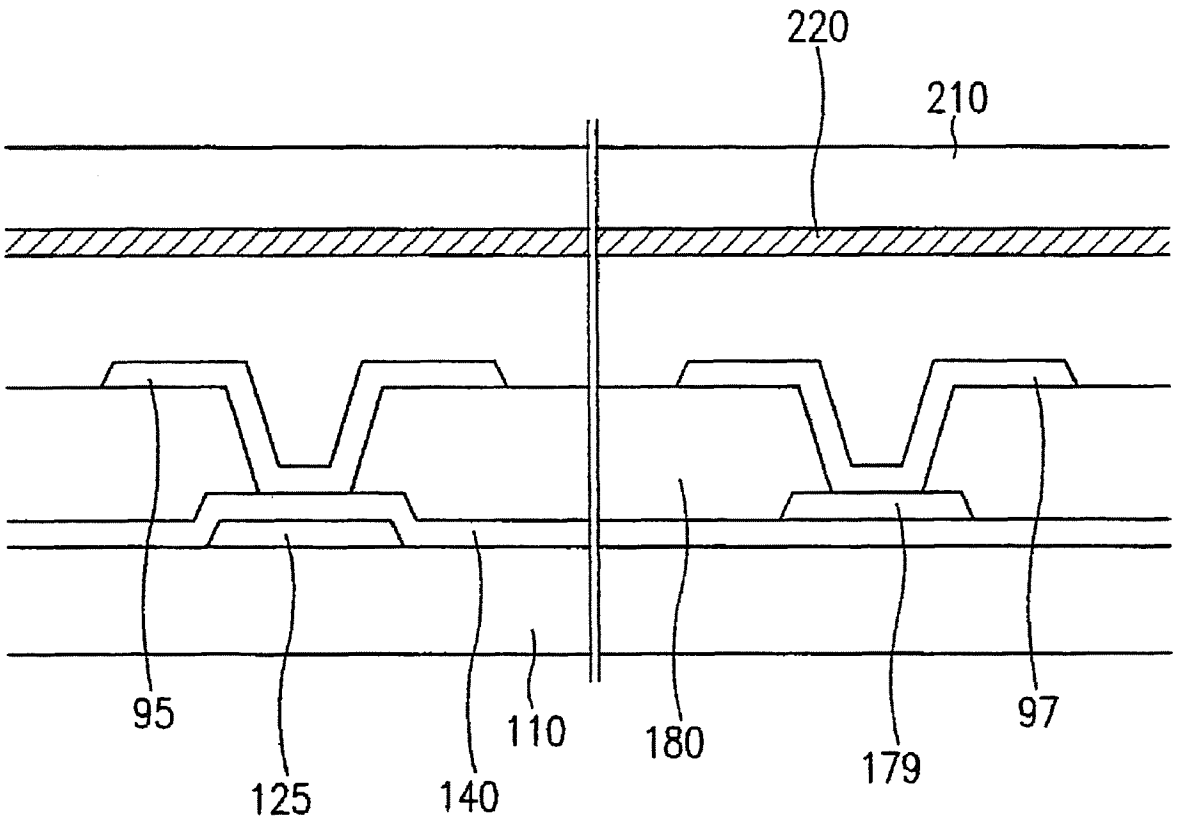
FIG. 3 is a sectional view of the LCD shown in FIG. 1 taken along the lines III-III'-III"
Figure 4:
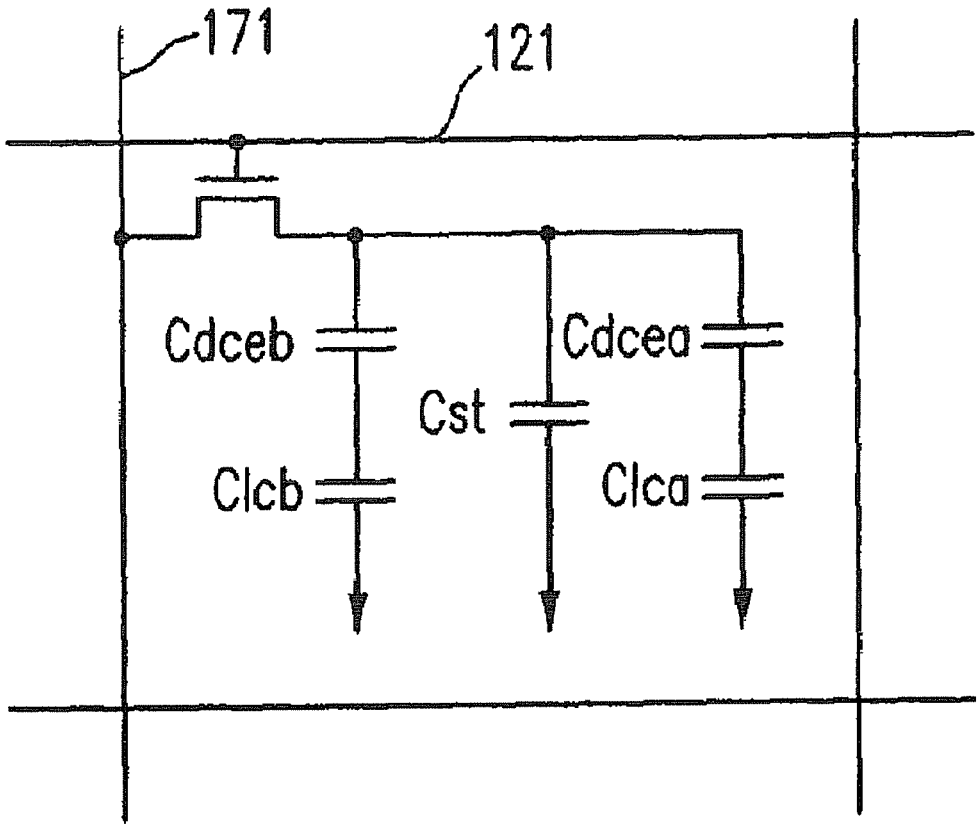
FIG. 4 is an equivalent circuit diagram of an LCD shown in FIGS. 1-3.

FIG. 1 is a layout view of an LCD an embodiment of the present invention, FIG. 2 is a sectional view of the LCD shown in FIG. 1 taken along the line II-II', FIG. 3 is a sectional view of the LCD shown in FIG. 1 taken along the lines III-III'-III", and FIG. 4 is an equivalent circuit diagram of an LCD shown in FIGS. 1-3.

An LCD according to an embodiment of the present invention includes a plurality of gate lines 121 transmitting gate signals, a plurality of data lines 171 transmitting data voltages, and a plurality of pixels connected to the gate lines 121 and the data lines 171. As shown in FIG. 4, each pixel includes a plurality of capacitors Clca, Clcb, Cdcea, Cdceb and Cst and a transistor. The transistor has a gate connected to a gate line 121, a source connected to a data line 171, and a drain connected to the capacitors Cdcea, Cdceb and Cst connected in parallel. The capacitors Cdcea and Clca are connected in series and the capacitors Cdceb and Clcb are connected in series. The capacitors Clca, Clcb and Cst are connected to a predetermined voltage such as the common voltage Vcom.

In structural view, the LCD includes a TFT array panel, a color filter array panel facing the TFT array panel and separated by a predetermined gap, and a liquid crystal layer filled in the predetermined gap, as shown in FIGS. 1-3.

Referring to FIGS. 1-3, the TFT array panel includes a plurality of gate lines 121 transmitting scanning signals, a plurality of data lines 171 transmitting data signals as well as a plurality of pairs of storage electrode lines 131a and 131b transmitting a predetermined voltage such as the common voltage Vcom. The gate lines 121 and the data lines 171 intersect each other to define a plurality of pixel areas.

Each pixel area is provided with a pair of pixel electrodes (PEs) 190a and 190b, a direction control electrode (DCE) 178, and a DCE TFT connected to one of the gate lines 121, one of the data lines 171, and the DCE 178.

The color filter array panel includes a plurality of color filters 230 and a common electrode 270 supplied with the common voltage Vcom.

The PEs 190a and 190b and the common electrode 270 along with the liquid crystal layer interposed therebetween form a pair of liquid crystal (LC) capacitors indicated by Clca and Clcb shown in FIG. 4. The PEs 190a and 190b and the storage electrode lines 131a and 131b along with an insulator disposed therebetween form a storage capacitor represented by Cst. The DCE 178 and the PEs 190a and 190b are capacitively coupled to form a pair of DCE capacitors represented by Cdcea and Cdceb.

The PEs 190a and 190b are floating and supplied with a coupling voltage obtained by the coupling with the DCE 178.

The reference numerals for the above-described capacitors are also used for indicating the capacitances of the capacitors in this specification.

The PEs 190a and 190b have a plurality of cutouts 191, 192a, 192b, 193a, 193b, 194a, 194b, 195a and 195b overlapping the DCE 178 such that an electric field generated by the DCE 178 goes out through the cutouts 191, 192a, 192b, 193a, 193b, 194a, 194b, 195a and 195b. The electric field generated by the DCE 178 pre-tilts liquid crystal molecules in the liquid crystal layer. (The term "cutout" in this specification includes gaps 191, 193a and 193b between separated portions of the PE 190a and between the separated PEs 190a and 190b if there is no particular mention.) The pretilted liquid crystal molecules are rapidly tilted without dispersion upon the application of the electric field generated by the PEs 190a and 190b.

In order to obtain the pretilt of the liquid crystal molecules using the electric field generated by the DCE 178, a voltage of the DCE 178 relative to a voltage of the common electrode 270 (referred to as a "DCE voltage" hereinafter) is larger than a voltage of the PEs 190a and 190b relative to a voltage of the common electrode 270 (referred to as a "pixel voltages" hereinafter) by a predetermined value.

The LCD according to an embodiment of the present invention easily satisfies this requirement by applying the coupling voltage to the floating PEs 190a and 190b.

Since the DCE voltage Vdce is substantially equal to a data voltage Vd, pixel voltages Va and Vb of the PEs 190a and 190b are obtained from the voltage distribution law as follows:

$$Va=Vd\times Cdcea/(Cdcea+Clca); \text{ and}$$

$$Vb=Vd\times Cdecb/(Cdecb+Clcb).$$

Accordingly, the DCE voltage Vdce is always higher larger than the pixel voltages Va and Vb.

In the meantime, when a pixel area includes two sub-areas with somewhat different electric fields, a lateral visibility is improved by the mutual compensation in the two subareas.

If the pixel voltage Va of the PE 190a is intended to be higher than the pixel voltage Vb of the PE 190b, the capacitances Cdcea, Clca, Cdceb and Clcb are determined to satisfy a relation, $$Cdcea/(Cdcea+Clca)>Cdceb/(Cdceb+Clcb).$$

The capacitances are adjusted by overlapping areas between the PEs 190a and 190b and the DCE 178.

Now, the LCD according to this embodiment is described more in detail with reference to FIGS. 1 to 3.

The TFT array panel is now described in detail.

A plurality of gate lines 121 are formed on an insulating substrate 110 and a plurality of data lines 171 are formed thereon. The gate lines 121 and the data lines 171 are insulated from each other and intersect each other to define a plurality of pixel areas.

Each pixel area is provided with a pair of PEs 190a and 190b, a DCE 178, and a DCE TFT.

The DCE TFT for switching voltages to be applied to the DCE 178 has three terminals, a gate electrode 123c connected to a gate line 121, a source electrode 173c connected to a data line 171, and a drain electrode 175c connected to the DCE 178. The DCE 178 is applied with a direction-controlling voltage for controlling the pre-tilts of the liquid crystal molecules to generate a direction-controlling electric field between the DCE 178 and the common electrode 270. The DCE 178 is formed in a step for forming the data lines 171. The PEs 190a and 190b are floating rather than being connected to the gate lines 121 or the data lines 171, and they overlap the DCE 178 to be capacitively coupled.

The layered structure of the TFT array panel will be described in detail.

A plurality of gate lines 121 and a plurality of pairs of first and second storage electrode lines 131a and 131b are formed on an insulating substrate 110.

Each gate line 121 extends substantially in a transverse direction and it includes a plurality of pairs of branches forming gate electrodes 123c and an expanded end portion 125 for signal reception from an external device.

Each storage electrode line 131a or 131b extends substantially in the transverse direction although it has some curves. Each pair of storage electrode lines 131a and 131b include a plurality of sets of branches forming first fourth storage electrodes 133a, 133b, 134a and 134a. The first and the second storage electrodes 133a and 133b are branched from the first and the second storage electrode lines 131a and 13b in a longitudinal direction, respectively. The third and the fourth storage electrodes 134a and 134b are branched from the first and the second storage electrode lines 131a and 131b in the longitudinal direction and they are curved to extend in oblique directions. The first storage electrode lines 131a and the second storage electrode lines 131b have inversion symmetry.

The gate lines 121 and the storage electrode lines 131a and 131b are preferably made of Al, Cr or their alloys, Mo or Mo alloy. If necessary, the gate lines 121 and the storage electrode lines 131a and 131b include a first layer preferably made of Cr or Mo alloys having excellent physical and chemical characteristics and a second layer preferably made of Al or Ag alloys having low resistivity.

A gate insulating layer 140 is formed on the gate lines 121 and the storage electrode lines 131a and 131b.

A semiconductor layer 151 and 154c preferably made of amorphous silicon is formed on the gate insulating layer 140. The semiconductor layer 151 and 154c includes a plurality of channel semiconductors 154c forming channels of TFTs and a plurality of data-line semiconductors 151 located under the data lines 171.

An ohmic contact layer 161, 163c and 165c preferably made of silicide or n+ hydrogenated amorphous silicon heavily doped with n type impurity is formed on the semiconductor layer 151 and 154c.

A plurality of data lines 171 including a plurality of source electrodes 173c, a plurality of drain electrodes 175c, and a plurality of DCEs 178 and 178a-178c are formed on the ohmic contact layer 161, 163c and 165c and the gate insulating layer 140.

The data lines 171 extend in the longitudinal direction and intersect the gate lines 121 to define a plurality of pixels. The source electrodes 173c and the drain electrodes 175c are disposed on respective portions 163c and 165c opposite each other. Each data line 171 includes an expanded end portion 179 for receiving data voltages from an external device.

The DCEs 178 and 178a-178c are located in the pixel areas defined by the intersections of the gate lines 121 and the data lines 171. Each DCE 178 and 178a-178c includes a stem 178 having a "V" shape with a chamfered bottom, a plurality of branches 178d and 178e having a chevron shape 178a, 178b and 178c.

The data lines 171, the drain electrodes 175c, and the DCEs 178 and 178a-178c are preferably made of Al, Cr or their alloys, Mo or Mo alloy. If necessary, the data lines 171, the drain electrodes 175c, and the DCEs 178 and 178a-178c include a first layer preferably made of Cr or Mo alloys having excellent physical and chemical characteristics and a second layer preferably made of Al or Ag alloys having low resistivity.

A passivation layer 180 preferably made of silicon nitride or organic insulator is formed on the data lines 171, the drain electrodes 175c, and the DCEs 178 and 178a-178c.

The passivation layer 180 and the gate insulating layer 140 are provided with a plurality of contact holes 183 exposing the end portions 125 of the gate lines 121 and a plurality of contact holes 184 exposing the end portions 179 of the data lines 171.

A plurality of first and second PEs 190a and 190b and a plurality of contact assistants 95 and 97 are formed on the passivation layer 180.

The first PE 190a has a pair of oblique cutouts 192a and 192b, and the second PE 190a has two pairs of oblique cutouts 194a, 194b, 195a and 195b. The oblique cutouts 192a, 192b, 194a, 194b, 195a and 195b have inversion symmetry with respect to an imaginary line bisecting the PEs 190a and 190b into upper and lower halves. The cutouts 192a, 192b, 194a, 194b, 195a and 195b overlap the DCE 178 and 178a-178c.

The first and the second PEs 190a and 190b also have inversion symmetry with respect to an imaginary line bisecting the PEs 190a and 190b into upper and lower halves.

A linear gap between the first PE 190a and the second PE 190b includes a pair of oblique portions 193a and 193b and a longitudinal portion disposed between the oblique portions 193a and 193b. The longitudinal portion is shorter than the oblique portions 193a and 193b.

The second PE 190b includes two partitions separated from each other by a cutout 191 parallel to the gate lines 121. Since the partitions of the second PE 190b have inversion symmetry, they have substantially the same potential although they are separated from each other.

The contact assistants 95 and 97 are connected to the exposed end portions 125 of the gate lines 121 and the exposed end portions 179 of the data lines 171 through the contact holes 183 and 184, respectively.

The PEs 190 and the contact assistants 95 and 97 are preferably formed of IZO or ITO.

To summarize, each PE 190 has the plurality of cutouts 191, 192a, 192b, 193a, 193b, 194a, 194b, 195a and 195b and some cutouts 191, 192a, 192b, 194a and 194b overlap the DCE 178 and 178a-178c. The DCE 178 and 178a-178c and the cutouts 191, 192a, 192b, 194a and 194b are aligned such that the DCE 178 and 178a-178c is exposed through the cutouts 191, 192a, 192b, 194a and 194b to be seen in front view.

The cutouts 191, 192a, 192b, 193a, 193b, 194a, 194b, 195a and 195b partition the pixel area into a plurality of subareas, and liquid crystal regions located on the subareas are called domains. The domains disposed opposite each other with respect to a cutout have different tilt directions and they are classified into four groups based on the tilt directions.

According to another embodiment of the present invention, the DCEs 178 and 178a-178c include substantially the same layer as the gate lines 121. Portions of the passivation layer 180 located on the DCEs 178 and 178a-178c may be removed to form a plurality of openings.

The upper panel will no be described in detail.

A black matrix 220 for preventing light leakage, a plurality of red, green and blue color filters 230, and a common electrode 270 preferably made of a transparent conductor such as ITO or IZO are formed on a substrate 210 preferably made of transparent insulating material such glass.

A plurality of liquid crystal molecules contained in the liquid crystal layer is aligned such that their director is perpendicular to the lower and the upper substrates 110 and 210 in absence of electric field. The liquid crystal layer has negative dielectric anisotropy.

The TFT array panel and the color filter panel are aligned such that the PEs 190a and 190b match and overlap the color filters 230. In this way, a pixel region is divided into a plurality of domains by the cutouts 191, 192a, 192b, 193a, 193b, 194a, 194b, 195a and 195b. The alignment of the liquid crystal layer in each domain is stabilized by the DCE 178 and 178a-178c.

In addition, the lateral visibility is improved by applying different voltages to the two pixel electrodes 190a and 190b.

This embodiment illustrates the liquid crystal layer having negative dielectric anisotropy and homeotropic alignment with respect to the substrates 110 and 210. However, the liquid crystal layer may have positive dielectric anisotropy and homogeneous alignment with respect to the substrates 110 and 210.

A TFT array panel according to another embodiment of the present invention may be manufactured using four photoetching steps. In this case, a semiconductor layer may have substantially the same planar shape as data lines, source electrode, drain electrodes, DCEs, and underlying ohmic contacts, which is resulted from the patterning using a single photoresist.

In the above-described LCD, the domain partitioning is made by the cutouts of the PEs, and the domain stability is reinforced by the DCE and the storage electrode. Therefore, the domain partitioning depends upon the cutout arrangement of the PE, the DCE, and the storage electrodes, and the domain stability is also largely influenced by the arrangement.

An exemplary TFT array panel for an LCD according to another embodiment of the present invention is described in detail with reference to FIG. 5.

Figure 5:
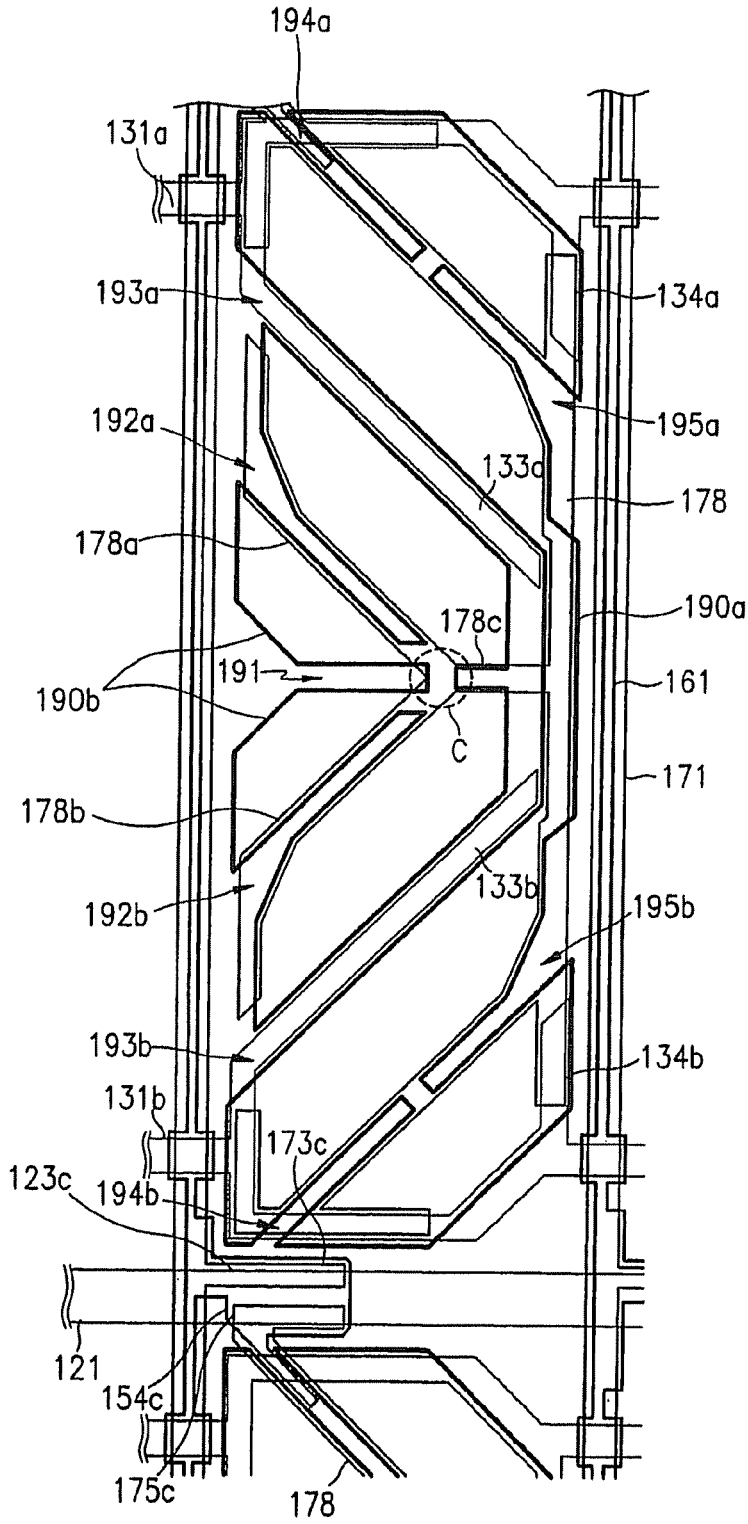
FIG. 5 is a layout view of an LCD according to another embodiment of the present invention.

FIG. 5 is a layout view of an LCD according to another embodiment of the present invention.

As shown in FIG. 5, an LCD according to this embodiment includes a plurality of first and second PEs 190a and 190b like the LCD shown in FIG. 2. Each of the second PEs 190b includes two partitions and a connection connecting the two partitions.

Figure 6:
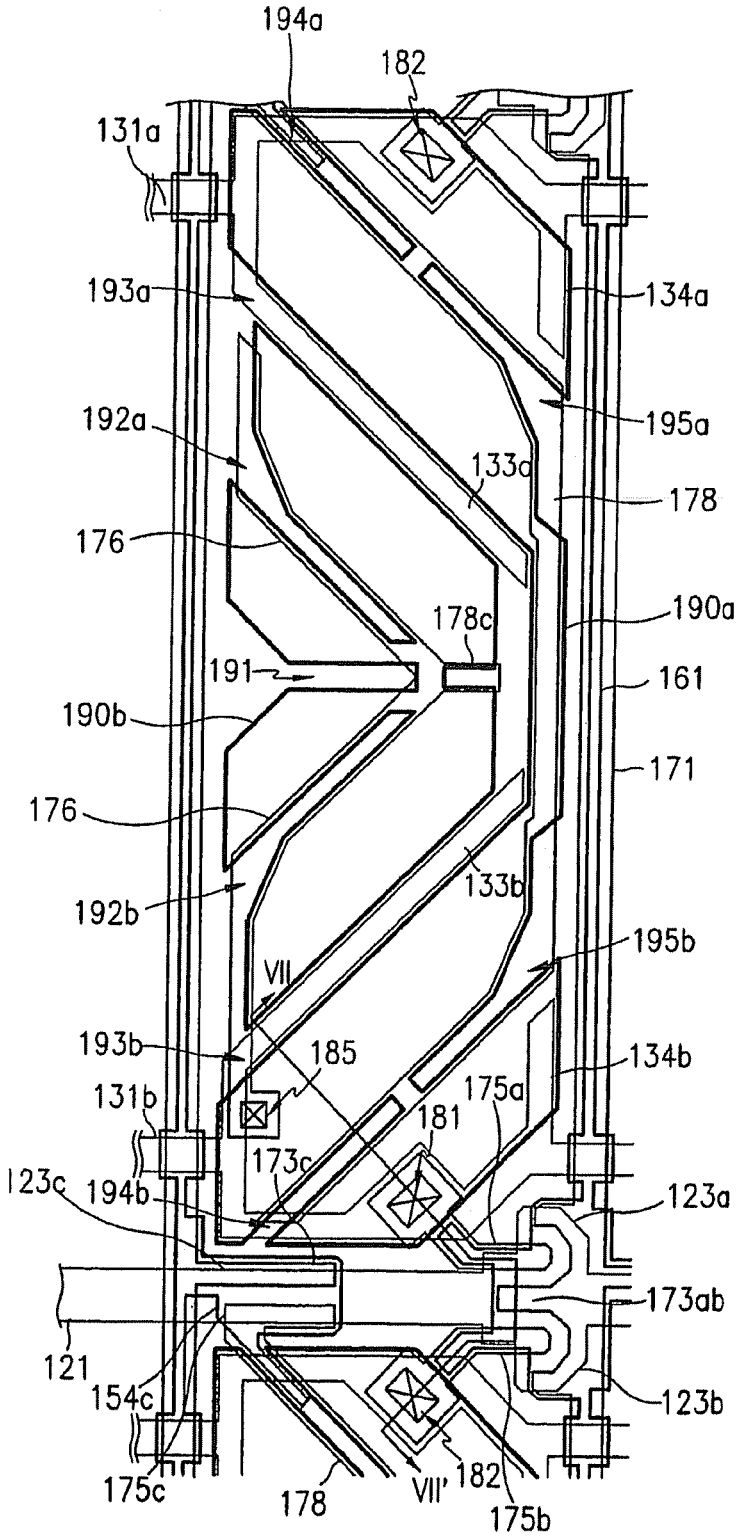
FIG. 6 is a layout view of an LCD according to another embodiment of the present invention.

Other structures of the TFT panel shown in FIG. 6 are similar to those shown in FIGS. 1-3.

An exemplary TFT array panel for an LCD according to another embodiment of the present invention is described in detail with reference to FIGS. 6-8.

Figure 7:
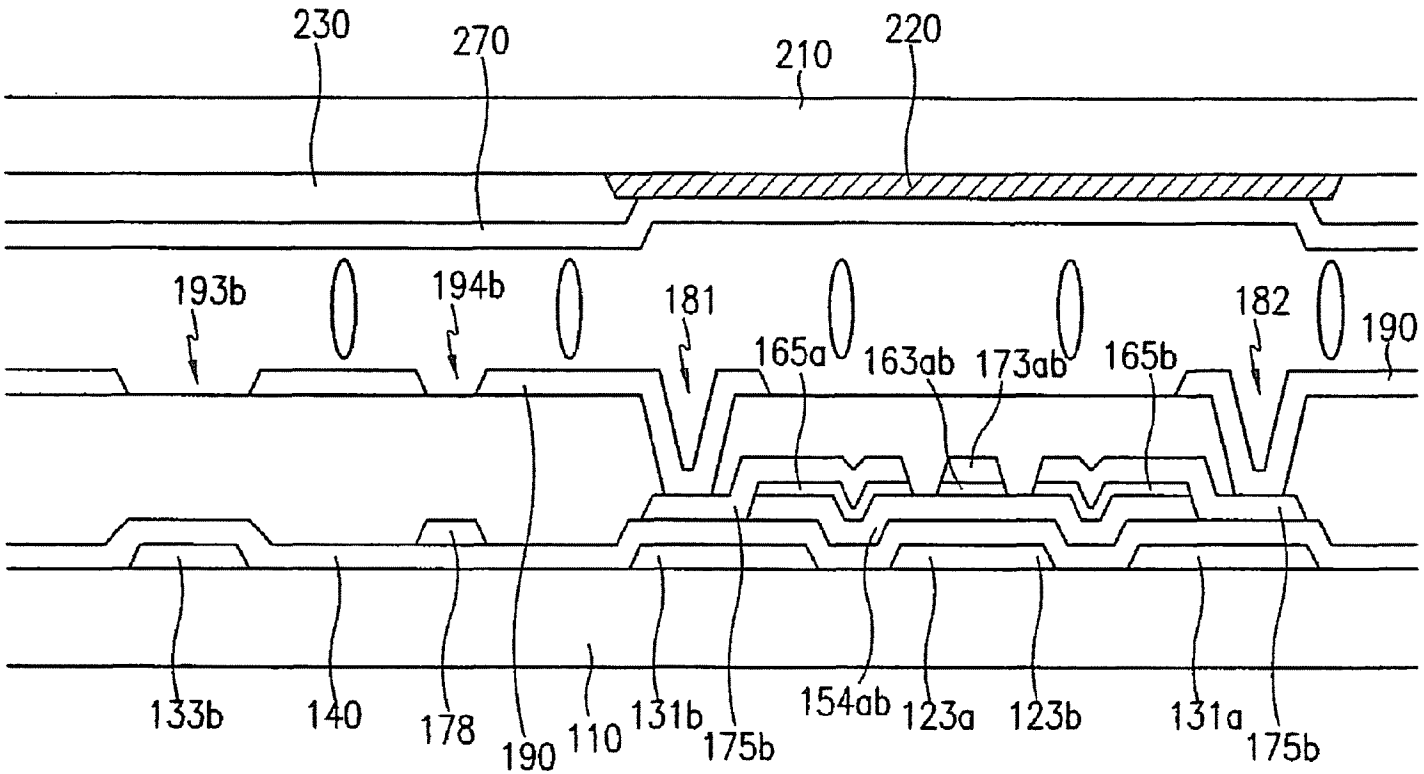
FIG. 7 is a sectional view of the LCD shown in FIG. 6 taken along the line VII-VII'.
Figure 8:
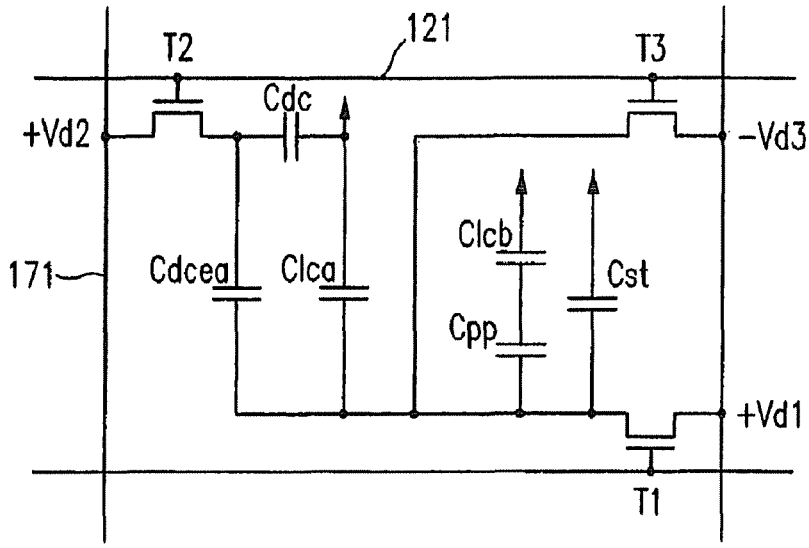
FIG. 8 is an equivalent circuit diagram of the LCD shown in FIGS. 6 and 7.

FIG. 6 is a layout view of an LCD according to another embodiment of the present invention, FIG. 7 is a sectional view of the LCD shown in FIG. 6 taken along the line VII-VII', and FIG. 8 is an equivalent circuit diagram of the LCD shown in FIGS. 6 and 7.

Referring to FIGS. 6-8, an LCD according to this embodiment also includes a plurality of gate lines 121, a plurality of data lines 171, and a plurality of pixels connected to the gate lines 121 and the data lines 171. Each pixel includes a pair of LC capacitors Clca and Clcb, DCE capacitors Cdcea and Cdc, a storage capacitor Cst, a coupling capacitor Cpp, and three TFTs T1, T2 and T3. The transistor T1 has a gate connected to a gate line, a source connected to a data line 171, and a drain connected to the capacitors Clca, Cdcea, Cpp and Cst connected in parallel, while the transistor T3 has a gate connected to a previous gate line, a source connected to the data line, and a drain connected to the capacitors Cdcea and Cdc connected in parallel. The transistor T2 has a gate connected to the previous gate line, a source connected to a previous data line, and a drain connected to the capacitors Clca, Cdcea, Cpp and Cst. The capacitor Clcb is connected between the capacitor Cpp and a predetermined voltage such as the common voltage Vcom, the capacitors Clca and Cdc are connected in common to a predetermined voltage such as the common voltage Vcom, and the capacitor Cst is connected to a predetermined voltage such as the common voltage Vcom.

In structural view, the LCD according to this embodiment also includes a TFT array panel, a color filter array panel facing the TFT array panel and separated with a predetermined gap, and a liquid crystal layer filled in the predetermined gap, as shown in FIGS. 6 and 7.

Referring to FIGS. 1-3, the TFT array panel includes a plurality of gate lines 121 transmitting scanning signals, a plurality of data lines 171 transmitting data signals as well as a plurality of pairs of storage electrode lines 131a and 131b transmitting a predetermined voltage such as the common voltage Vcom. The gate lines 121 and the data lines 171 intersect each other to define a plurality of pixel areas.

Each pixel area is provided with first and second PEs 190a and 190b, a coupling electrode 176, a DCE 178, first and second PE TFTs (indicated by the reference numerals T1 and T3 in FIG. 8) for the PEs 190a and 190b, and a DCE TFT (indicated by the reference T2 in FIG. 8) for the DCE 178. The first PE TFT T1 includes a gate electrode 121a connected to a gate line 121, a source electrode 173ab connected to a data line 171, and a drain electrode 175a connected to the first PE 190a, while the second PE TFT T3 includes a gate electrode 123b connected to a previous gate line 121, a source electrode 173ab connected to the data line 171, and a drain electrode 175b connected to the first PE 190a. The DCE TFT T2 includes a gate electrode 123c connected to the previous gate line 121, a source electrode 173c connected to a previous data line, and a drain electrode 175c connected to the DCE 178.

The color filter array panel includes a plurality of color filters 230 and a common electrode 270 supplied with the common voltage Vcom.

The first and the second PEs 190a and 190b and the common electrode 270 along with the liquid crystal layer interposed therebetween form a pair of liquid crystal (LC) capacitors indicated by Clca and Clcb shown in FIG. 8. The first and the second PEs 190a and 190b and the storage electrode lines 131a and 131b along with an insulator disposed therebetween form a storage capacitor represented by Cst. The DCE 178 and the first PE 190a are capacitively coupled to form a DCE capacitor represented by Cdcea, and the DCE 178 and the common electrode 270 are capacitively coupled to for a DCE capacitor Cdc. The first PE 190a and the second PE 190b are capacitively coupled through the coupling capacitor 176 to form a coupling capacitor Cpp.

The PEs 190a and 190b have a plurality of cutouts 191, 192a, 192b, 193a, 193b, 194a, 194b, 195a and 195b overlapping the DCE 178 and the coupling electrode 176 such that electric fields generated by the DCE 178 and the coupling electrode 176 go out through the cutouts 191, 192a, 192b, 193a, 193b, 194a, 194b, 195a and 195b. The electric fields generated by the DCE 178 and the coupling electrode 176 pre-tilt liquid crystal molecules in the liquid crystal layer. The pretilted liquid crystal molecules are rapidly tilted without dispersion upon the application of the electric field generated by the first and the second PEs 190a and 190b.

The lateral visibility is improved by applying somewhat different voltages to the first and the second PEs 190a and 190b.

It is assumed that the LCD having the above-described structure is subject to a dot inversion. Referring to FIG. 8, a gate-on voltage applied to a previous gate line turns on the transistors T2 and T3 such that the DCE 178 is charged with a data voltage having a positive polarity with respect to the common voltage Vcom, while the first PE 190a is charged with a data voltage having a negative polarity. Accordingly, the initial voltage charged in the DCE capacitor Cdcea is equal to the voltage difference between the positive data voltage and the negative data voltage. When the gate-on voltage is applied to a relevant gate line, the transistor T1 is turned on to apply a positive data voltage to the first PE 190a and the transistors T2 and T3 are turned off to float the DCE 178. Accordingly, the voltage Vdce of the DCE 178 increases as the voltage Va of the first PE 190a increases.

Accordingly, the DCE voltage Vdce is always higher than the pixel voltage Va of the first PE 190a by an amount of (Vdce−Va), thereby obtaining pre-tilt angles of the liquid crystal molecules.

The voltage Vdce of the DCE 178 is given by:

$$Vdce=Vd1+[-C3\times Vd1+(C2+C3)Vd2+C2\times Vd3]/(C2+C3),$$

where $$C1=Clac+Cst+(Cpp\times Clcb)/(Cpp+Clcb),$$

$$C2=Cdcea, \text{ and}$$

$$C3=Cdc.$$

Here, the parasitic capacitance between the gate electrode and the drain electrode of the transistors is ignored.

The pixel voltage Vb of the second PE 190b is calculated from the voltage distribution rule:

$$Vb=Va\times Cpp/(Cpp+Clcb).$$

Since Cpp/(Cpp+Clcb) is smaller than 1, the pixel voltage Va is higher than the pixel voltage Vb by a predetermined portion.

As described above, two PEs having different voltages in a pixel area compensate to improve the lateral visibility.

Figure 9:
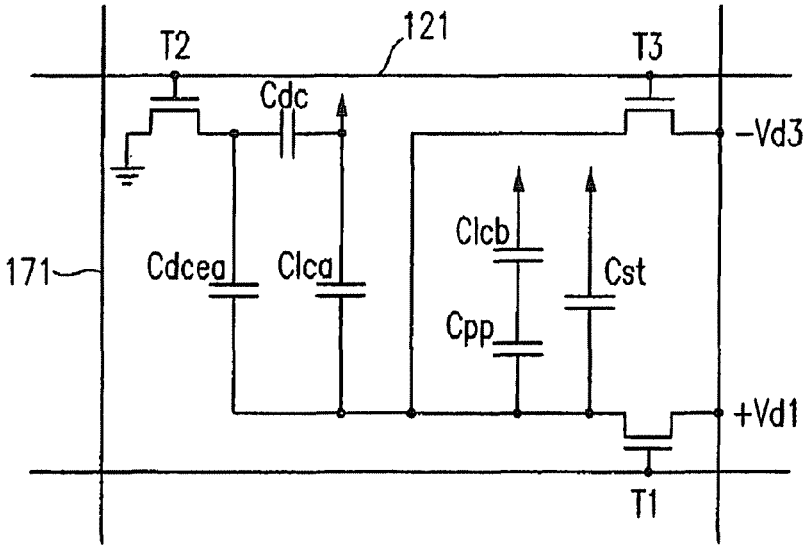
FIGS. 9 and 10 are equivalent circuit diagrams of LCDs according to embodiments of the present invention.
Figure 10:
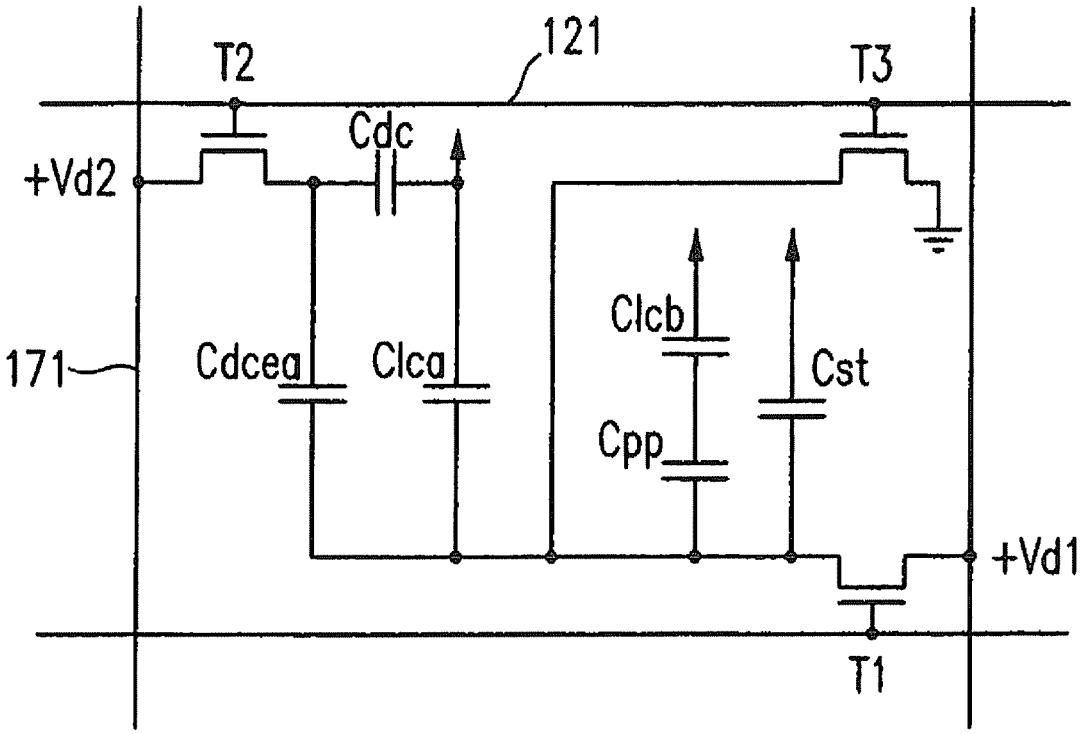

FIGS. 9 and 10 are equivalent circuit diagrams of LCDs according to embodiments of the present invention.

As shown in FIG. 9, the source of the DCE transistor T2 is grounded or connected to the common voltage Vcom through such as a storage electrode line. Referring to FIGS. 6 and 7, the connection is obtained by providing a contact hole penetrating the gate insulating layer 140 and the passivation layer 180 to expose the storage electrode line 131a or 131b and a contact hole penetrating the passivation layer 180 to expose the source electrode 173c and by forming a connection (not shown) for connecting the source electrode 173c to the storage electrode line 131a or 131b.

Assuming the parasitic capacitance between the gate electrode and the drain electrode of the transistors is negligible, the voltage Vdce of the DCE 178 shown in FIG. 9 is given by:

$$Vdce=Vd1+[-C3\times Vd1+C2\times Vd3]/(C2+C3),$$

where C1=Clac+Cst+(Cpp×Clcb)/(Cpp+Clcb), C2=Cdcea, and C3=Cdc.

As shown in FIG. 10, the source of the second PE transistor T2 is grounded or connected to the common voltage Vcom through such as a storage electrode line. Referring to FIGS. 6 and 7, the connection is obtained by providing a contact hole penetrating the gate insulating layer 140 and the passivation layer 180 to expose the storage electrode line 131a or 131b and a contact hole penetrating the passivation layer 180 to expose the source electrode 173ab of the second PE transistor T2 and by forming a connection (not shown) for connecting the source electrode 173ab to the storage electrode line 131a or 131b.

Assuming the parasitic capacitance between the gate electrode and the drain electrode of the transistors is negligible, the voltage Vdce of the DCE 178 shown in FIG. 10 is given by:

$$Vdce=Vd1+[-C3\times Vd1+(C2+C3)Vd2]/(C2+C3)$$

where C1=Clac+Cst+(Cpp×Clcb)/(Cpp+Clcb), C2=Cdcea, and C3=Cdc.

Figure 11:
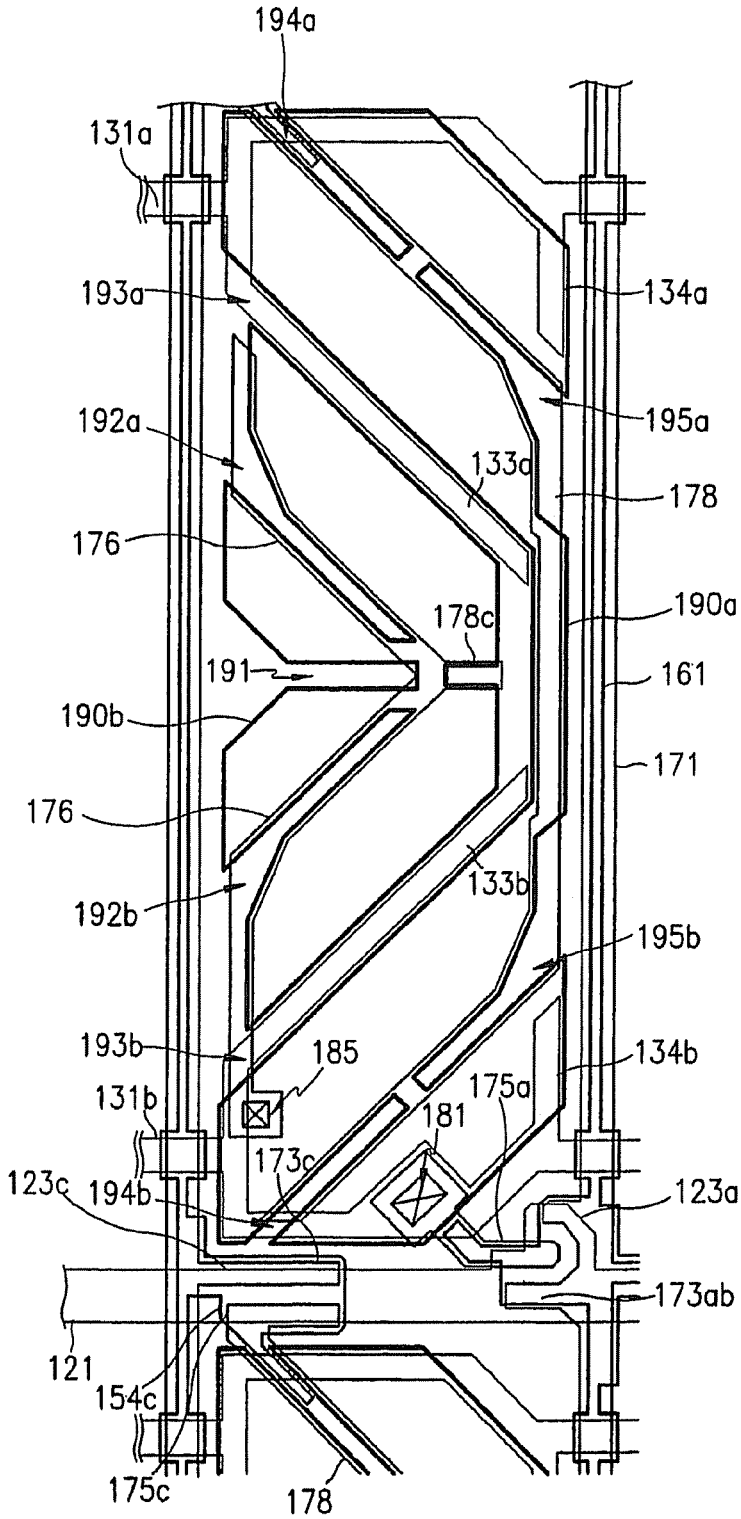
FIG. 11 is a layout view of an LCD according to another embodiment of the present invention.
Figure 12:
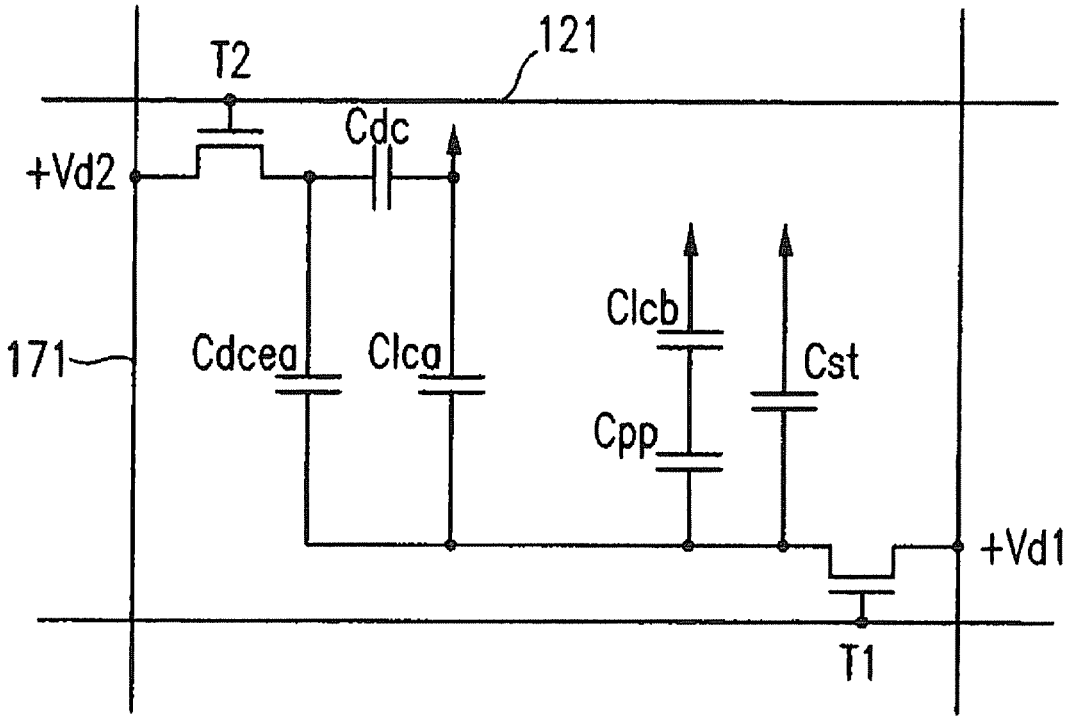
FIG. 12 is an equivalent circuit diagram of the LCD shown in FIG. 11.

FIG. 11 is a layout view of an LCD according to another embodiment of the present invention, and FIG. 12 is an equivalent circuit diagram of the LCD shown in FIG. 11.

Referring to FIGS. 11 and 12, the second PE TFT T3 is omitted.

Assuming the parasitic capacitance between the gate electrode and the drain electrode of the transistors is negligible, the voltage Vdce of the DCE 178 shown in FIGS. 11 and 12 is given by:

$$Vdce=(C1+C3)[(2-C3/C2)Vd1+Vd2]/(2C2+C1)$$

where C1=Clac+Cst+(Cpp×Clcb)/(Cpp+Clcb), C2=Cdcea, and C3=Cdc.

As described above, the LCDs shown in FIGS. 6-12 include the coupling electrodes 176 for capacitively coupling the first PE 190a and the second PE 190b.

Figure 13:
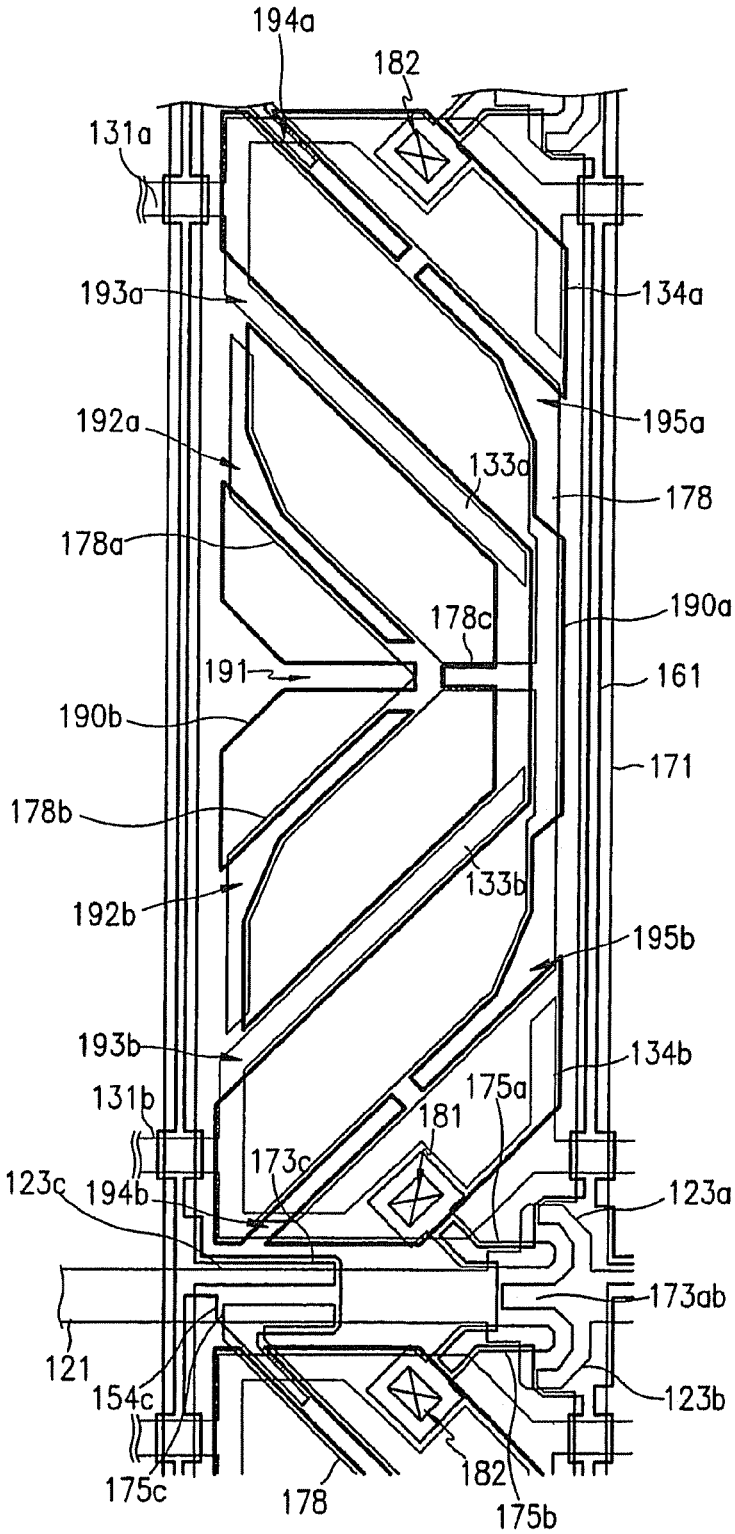
FIG. 13 is a layout view of an LCD according to another embodiment of the present invention.
Figure 14:
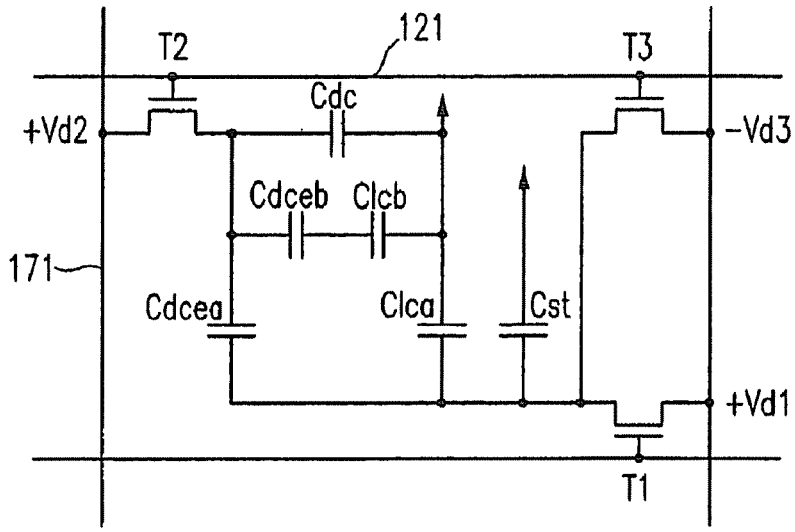
FIG. 14 is an equivalent circuit diagram of the LCD shown in FIG. 13.

FIG. 13 is a layout view of an LCD according to another embodiment of the present invention, and FIG. 14 is an equivalent circuit diagram of the LCD shown in FIG. 13.

Referring to FIG. 13, the coupling electrode 176 shown in FIGS. 6-12 is omitted and thus there is not coupling capacitor Cpp shown in FIGS. 6-12. Instead, the DCE 178 is capacitively coupled with both the first and the second pixel electrodes 190a and 190b to form a pair of DCE capacitors Cdcea and Cdceb.

Accordingly, the capacitors Cdcea, Cdceb and Cdc are connected in parallel to the drain of the DCE TFT T2, and the capacitors Clca, Clcb and Cdc are connected in parallel to the common voltage Vcom. The capacitors Clca, Cdcea and Cst are connected in parallel to the first PE TFT T1 and the storage capacitor Cst is connected to a predetermined voltage such as the common voltage Vcom. The DCE capacitor Cdceb and the LC capacitor Clcb are connected in series.

The voltage Vdce of the DCE 178 is given by:

$$Vdce=Vd1+[-C3\times Vd1+(C2+C3)Vd2+C2\times Vd3]/(C2+C3),$$

where $$C1=Clac+Cst,$$

$$C2=Cdcea, \text{ and}$$

$$C3=Cdc+(Cdecb\times Clcb)/(Cdceb+Clcb).$$

Here, the parasitic capacitance between the gate electrode and the drain electrode of the transistors is ignored.

The pixel voltage Vb of the second PE 190b is calculated from the voltage distribution rule:

$$Vb=Vdce\times Cdceb/(Cdceb+Clcb)$$

As described above, two PEs having different voltages in a pixel area compensate to improve the lateral visibility.

Figure 15:
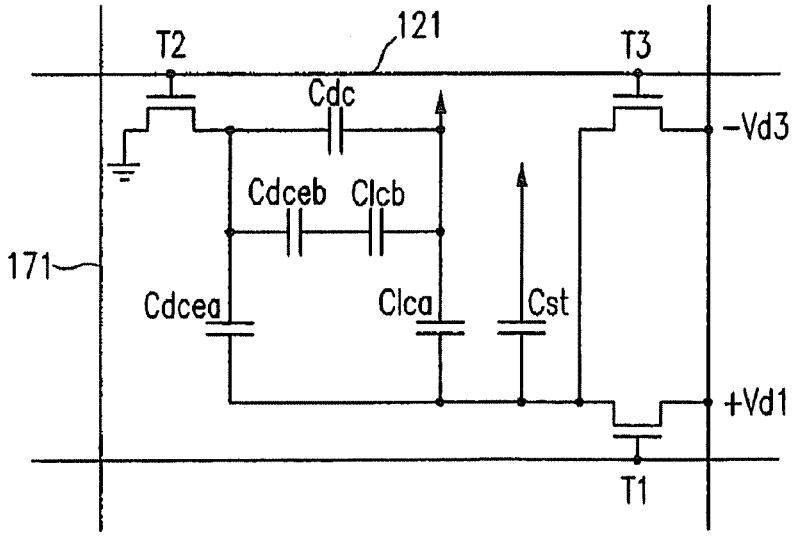
FIGS. 15 and 16 are equivalent circuit diagrams of LCDs according to embodiments of the present invention.
Figure 16:
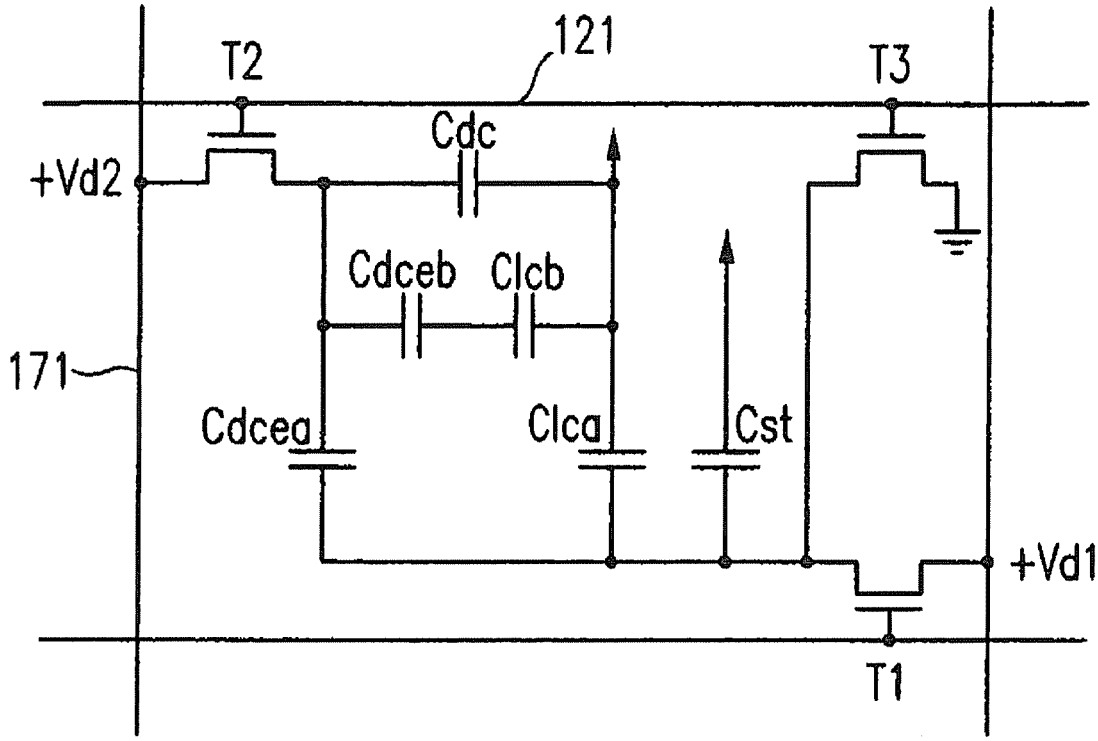

FIGS. 15 and 16 are equivalent circuit diagrams of LCDs according to embodiments of the present invention.

As shown in FIG. 15, the source of the DCE transistor T2 is grounded or connected to the common voltage Vcom through such as a storage electrode line.

Assuming the parasitic capacitance between the gate electrode and the drain electrode of the transistors is negligible, the voltage Vdce of the DCE 178 shown in FIG. 15 is given by:

$$Vdce=Vd1+[-C3\times Vd1+C2\times Vd3]/(C2+C3),$$

where C1=Clac+Cst, C2=Cdcea, and C3=Cdc+(Cdecb×Clcb)/(Cdceb+Clcb).

As shown in FIG. 16, the source of the second PE transistor T2 is grounded or connected to the common voltage Vcom through such as a storage electrode line.

Assuming the parasitic capacitance between the gate electrode and the drain electrode of the transistors is negligible, the voltage Vdce of the DCE 178 shown in FIG. 16 is given by:

$$Vdce=Vd1+[-C3\times Vd1+(C2+C3)Vd2]/(C2+C3)$$

where C1=Clac+Cst, C2=Cdcea, and C3=Cdc+(Cdecb×Clcb)/(Cdceb+Clcb).

Figure 17:
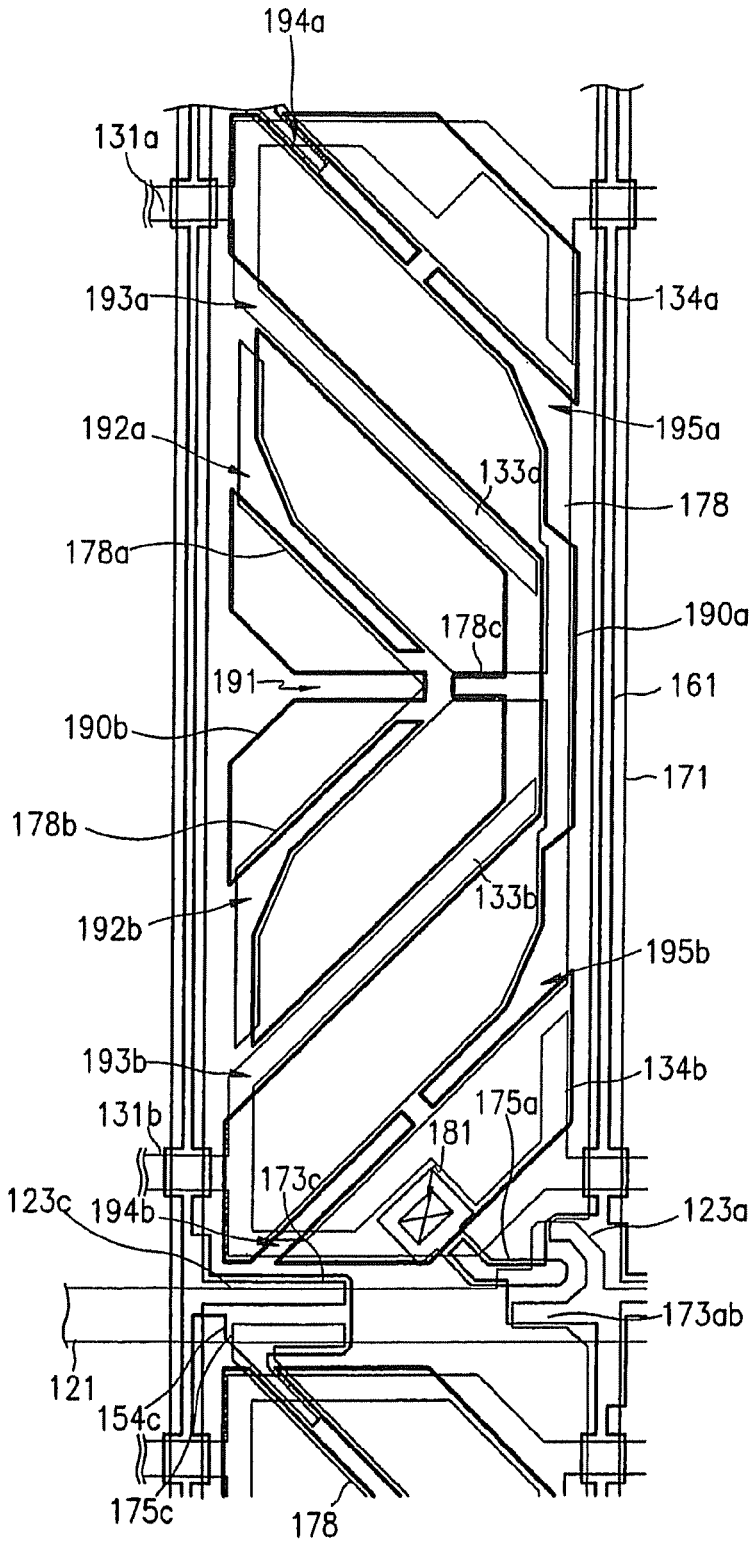
FIG. 17 is a layout view of an LCD according to another embodiment of the present invention.
Figure 18:
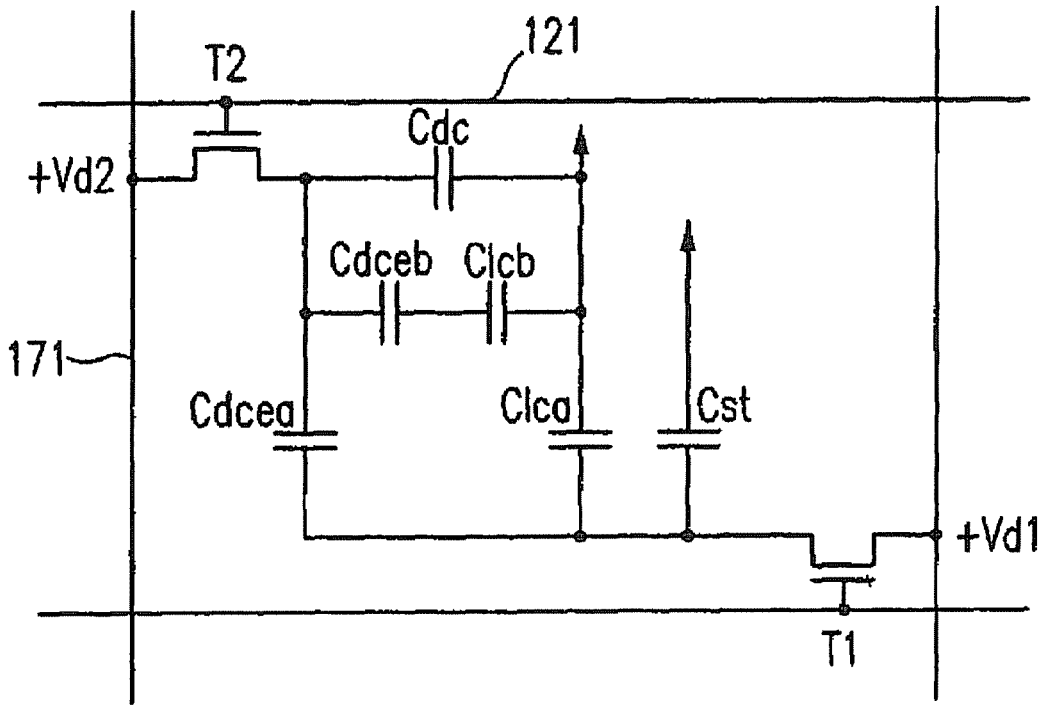
FIG. 18 is an equivalent circuit diagram of the LCD shown in FIG. 11.

FIG. 17 is a layout view of an LCD according to another embodiment of the present invention, and FIG. 18 is an equivalent circuit diagram of the LCD shown in FIG. 11.

Referring to FIGS. 17 and 18, the second PE TFT T3 is omitted.

Assuming the parasitic capacitance between the gate electrode and the drain electrode of the transistors is negligible, the voltage Vdce of the DCE 178 shown in FIGS. 11 and 12 is given by:

$$Vdce=(C1+C3)[(2-C3/C2)Vd1+Vd2]/(2C2+C1)$$

where C1=Clac+Cst, C2=Cdcea, and C3=Cdc+(Cdecb×Clcb)/(Cdceb+Clcb).

As described above, the DCE stabilizes the domains and the pair of PEs supplied with different voltages improves the lateral visibility.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:

an insulating substrate;

a first signal wire formed on the insulating substrate;

a second signal wire formed on the insulating substrate and intersecting the first signal wire in an insulating manner;

a first pixel electrode and a second pixel electrode formed in a pixel area [defined by the intersections of the first signal wire and the second signal wire];

a coupling electrode formed in the pixel area and overlapping at least one of the first pixel electrode and the second pixel electrode; and a first thin film transistor connected with the coupling electrode, the first signal wire, and the second signal wire.

2. The thin film transistor array panel of claim 1, wherein a voltage applied to the first pixel electrode is different from a voltage applied to the second [pbcel] *pixel* electrode.

3. The thin film transistor array panel of claim 1, wherein the first pixel electrode and the second pixel electrode include a plurality of sub-areas partioned by a plurality of cutouts.

4. The thin film transistor array panel of claim 3, wherein a voltage applied to the first pixel electrode is different from a voltage applied to the second pixel electrode.

5. The thin film transistor array panel of claim 3, wherein the cutouts of the second pixel electrode comprise a transverse cutout bisecting the second pixel electrode into upper and lower halves and a plurality of first oblique cutouts inversely symmetrical with *respect to* the transverse cutout, and wherein the cutouts of the first pixel electrode comprise a plurality of second oblique cutouts inversely symmetrical with the transverse cutout.

6. The thin film transistor array panel of claim 3, wherein the first pixel electrode and the second pixel electrode are inversely symmetrical with the transverse cutout.

7. The thin film transistor array panel of claim 6, further comprising:

a third signal wire intersecting the second signal wire in an insulating manner and including an electrode disposed between the first pixel electrode and the second pixel electrode.

8. The thin film transistor array panel of claim 1, further comprising:

a second thin film transistor connected with the first pixel electrode, the first signal wire, and the second signal wire.

9. The thin film transistor array panel of claim 8, further comprising:

a third thin film transistor connected with the first pixel electrode, the first signal wire, and the second signal wire.

10. The thin film transistor array panel of claim 1, further comprising a third signal wire intersecting the second signal wire in an insulating manner.

*11. A liquid crystal display, comprising;*

*a first substrate;*

*a plurality of first signal lines on the substrate;*

*a plurality of pixels disposed in a matrix on the first substrate, one of the plurality of pixels comprising a first pixel electrode electrically connected to a first transistor and a second pixel electrode separated from the first pixel electrode, wherein the pixel is disposed between two consecutive first signal lines of the plurality of first signal lines;*

*a second substrate facing the first substrate and having a common electrode; and*

*a liquid crystal layer interposed between the first substrate and the second substrate and comprising a plurality of liquid crystal molecules,*

*wherein the liquid crystal layer on one of the first pixel electrode and the second pixel electrode in the pixel is divided into at least four domains,*

*wherein each domain is defined by a single orientation direction of the liquid crystal molecules different from all of the other domains when a voltage is applied to one of the first pixel electrode and the second pixel electrode,*

*wherein an electric field generated between the first electrode and the common electrode is different from an electric field generated between the second electrode and the common electrode, and*

*wherein orientation directions of the liquid crystal molecules of the at least four domains are oblique with respect to one of the plurality of first signal lines.*

*12. The liquid crystal display of claim 11, wherein the liquid crystal molecules of an individual domain of the at least four domains are vertically aligned with the first substrate in the absence of an applied electric field.*

*13. The liquid crystal display of claim 12, wherein the at least four domains of the liquid crystal layer are defined by at least one domain-partitioning member.*

*14. The liquid crystal display of claim 13, wherein the at least one domain-partitioning member is disposed on the first substrate.*

*15. The liquid crystal display of claim 14, wherein the at least one domain-partitioning member includes a plurality of slits within the first pixel electrode.*

*16. The liquid crystal display of claim 11, further comprising a coupling electrode which applies an electric field to one of the first pixel electrode and the second pixel electrode,*

*wherein the coupling electrode is connected to one of the first pixel electrode and the second pixel electrode.*

*17. The liquid crystal display of claim 16, wherein the coupling electrode contacts the first pixel electrode via a contact hole through an insulating layer.*

*18. The liquid crystal display of claim 17, wherein the coupling electrode is overlapped with the second pixel electrode and the insulating layer is disposed therebetween.*

*19. The liquid crystal display of claim 18, further comprising a plurality of storage electrode lines each of which are disposed between two adjacent first signal lines of the plurality of first signal lines.*

*20. The liquid crystal display of claim 19, wherein a storage electrode line of the plurality of storage electrode lines is capacitively coupled with the first pixel electrode.*

*21. The liquid crystal display of claim 20, wherein the storage electrode line of the plurality of storage electrode lines is capacitively coupled with the second pixel electrode.*

*22. The liquid crystal display of claim 21, wherein the storage electrode line of the plurality of storage electrode lines is overlapped with at least a portion of the first pixel electrode and the second pixel electrode.*

*23. The liquid crystal display of claim 22, wherein the coupling electrode is overlapped with the storage electrode line of the plurality of storage electrode signal lines.*

*24. The liquid crystal display of claim 21, wherein a surface area of the first pixel electrode is different from a surface area of the second pixel electrode.*

*25. The liquid crystal display of claim 24, wherein a shape of a boundary of the first pixel electrode is different from a shape of a boundary of the second pixel electrode.*

*26. The liquid crystal display of claim 25, wherein the boundary of the first pixel electrode and the boundary of the second pixel electrode are both polygonal.*

*27. The liquid crystal display of claim 25, wherein the surface area of the first pixel cleclrode is 30% to 70% of a surface area of an individual pixel.*

*28. The liquid crystal display of claim 11, wherein a shape of a boundary of the first pixel electrode is different from a shape of a boundary of the second pixel electrode.*

*29. The liquid crystal display of claim 28, wherein the boundary of the first pixel electrode and the boundary of the second pixel electrode are both polygonal.*

*30. The liquid crystal display of claim 11, wherein the liquid crystal layer vertically aligned with each of the first pixel electrode and the second pixel electrode in a single pixel of the plurality of pixels is divided into four domains.*

*31. The liquid crystal display of claim 11, wherein the first pixel electrode and the second pixel electrode of each pixel of the plurality of pixels are disposed in a same layer of the liquid crystal display.*

*32. The thin film transistor array panel of claim 1, wherein the pixel area is defined by the intersections of the first and the second signal wires.*

* * * * *

UNITED STATES PATENT AND TRADEMARK OFFICE

CERTIFICATE OF CORRECTION

PATENT NO. : RE44,166 E
APPLICATION NO. : 12/889001
DATED : April 23, 2013
INVENTOR(S) : Hee-Seob Kim et al.

It is certified that error appears in the above-identified patent and that said Letters Patent is hereby corrected as shown below:

In the Claims

In Column 13, Lines 29-30, in Claim 11, delete "first electrode" and insert --first pixel electrode--.

In Column 13, Line 31, in Claim 11, delete "second electrode" and insert --second pixel electrode--.

Signed and Sealed this
Second Day of August, 2016

Michelle K. Lee

Michelle K. Lee
*Director of the United States Patent and Trademark Office*